United States Patent
Cook et al.

(10) Patent No.: US 8,711,008 B2
(45) Date of Patent: Apr. 29, 2014

(54) METHODS AND SYSTEMS FOR DETECTING ICING CONDITIONS

(75) Inventors: Donald E. Cook, Lynnwood, WA (US); Michael P. Feider, Arlington, WA (US)

(73) Assignee: The Boeing Company, Chicago, IL (US)

( * ) Notice: Subject to any disclaimer, the term of this patent is extended or adjusted under 35 U.S.C. 154(b) by 1049 days.

(21) Appl. No.: 10/568,793

(22) PCT Filed: Aug. 20, 2003

(86) PCT No.: PCT/US03/26403
§ 371 (c)(1),
(2), (4) Date: May 27, 2008

(87) PCT Pub. No.: WO2005/020175
PCT Pub. Date: Mar. 3, 2005

(65) Prior Publication Data
US 2008/0218385 A1      Sep. 11, 2008

(51) Int. Cl.
*G08B 21/00* (2006.01)
(52) U.S. Cl.
USPC .......................... 340/962; 340/601; 340/963
(58) Field of Classification Search
USPC ................... 340/945, 962–964, 967, 970
See application file for complete search history.

(56) References Cited

U.S. PATENT DOCUMENTS

| | | | |
|---|---|---|---|
| 2,656,525 A | 10/1953 | Kinsella | |
| 2,699,537 A | 1/1955 | Sederstrom | |
| 2,755,456 A | 7/1956 | Bursack | |
| 2,970,475 A | 2/1961 | Werner | |
| 3,000,213 A | 9/1961 | Eves et al. | |
| 3,057,198 A | 10/1962 | Crouchman | |
| 3,083,546 A | 4/1963 | Turek | |
| 3,167,960 A | 2/1965 | Miesiak | |
| 3,201,990 A | 8/1965 | Wald | |
| 3,229,271 A | 1/1966 | Frant | |
| 3,236,093 A | 2/1966 | Werner | |

(Continued)

FOREIGN PATENT DOCUMENTS

| DE | 3506317 C1 | 2/1986 |
|---|---|---|
| GB | 674750 | 7/1952 |

(Continued)

OTHER PUBLICATIONS

International Search Report for PCT/US03/26403, The Boeing Company, dated Sep. 2, 2004, 4 pgs.

(Continued)

*Primary Examiner* — James Yang
(74) *Attorney, Agent, or Firm* — Perkins Coie LLP (57) ABSTRACT

Methods and systems for detecting icing or incipient icing conditions external to a vehicle (100) are disclosed. An apparatus in accordance with one embodiment of the invention includes a temperature sensor (120) configured to direct a first signal corresponding to a temperature of an airstream, and a water content sensor (130) configured to direct a second signal corresponding to a water content of the airstream. A processing unit (140) can receive the first and second signals and, based on at least the first and second signals, provide an indication (150) when at least the first and second signals taken together correspond to an at least incipient icing condition. Accordingly, the system can be installed on aircraft to provide notice to the crew of incipient or existing icing conditions.

20 Claims, 5 Drawing Sheets

(56) References Cited

U.S. PATENT DOCUMENTS

| | | | |
|---|---|---|---|
| 3,276,254 A | 10/1966 | Richard | |
| 3,284,003 A | 11/1966 | Ciemochowski | |
| 3,287,974 A | 11/1966 | Ciemonchowski | |
| 3,422,677 A | 1/1969 | Lockwood | |
| 3,517,900 A | 6/1970 | Roussel | |
| 3,596,263 A | 7/1971 | Ciemochowski | |
| 3,596,264 A | 7/1971 | Ciemochowski | |
| 3,798,971 A | 3/1974 | Lowrance | |
| 3,917,193 A | 11/1975 | Runnels, Jr. | |
| 3,933,327 A | 1/1976 | Cook et al. | |
| 3,940,622 A | 2/1976 | Stallabrass et al. | |
| 3,976,270 A | 8/1976 | Catchpole et al. | |
| 4,032,090 A | 6/1977 | Thornton-Trump | |
| 4,036,457 A | 7/1977 | Volkner et al. | |
| 4,129,993 A | 12/1978 | Schotten | |
| 4,152,938 A | 5/1979 | Danninger | |
| 4,210,021 A | 7/1980 | Vykhodtsev et al. | |
| 4,222,044 A | 9/1980 | Boschung | |
| 4,333,004 A * | 6/1982 | Forgue et al. | 219/497 |
| 4,393,692 A | 7/1983 | Clark et al. | |
| 4,403,872 A | 9/1983 | DeLeo | |
| 4,482,114 A | 11/1984 | Gupta et al. | |
| 4,503,707 A | 3/1985 | Rosa et al. | |
| 4,508,295 A | 4/1985 | Cattaneo et al. | |
| 4,579,462 A | 4/1986 | Rall et al. | |
| 4,611,492 A | 9/1986 | Koosmann | |
| 4,674,714 A | 6/1987 | Cole et al. | |
| 4,688,745 A | 8/1987 | Rosenthal | |
| 4,733,834 A | 3/1988 | Phillips, II | |
| 4,738,416 A | 4/1988 | Birbragher | |
| 4,743,740 A | 5/1988 | Adee | |
| 4,752,049 A | 6/1988 | Cole | |
| 4,808,009 A | 2/1989 | Sittler et al. | |
| 4,831,819 A | 5/1989 | Norris et al. | |
| 4,850,093 A | 7/1989 | Parente | |
| 4,890,494 A | 1/1990 | Osbond et al. | |
| 4,907,449 A | 3/1990 | Call et al. | |
| 4,908,599 A | 3/1990 | Breen et al. | |
| 4,980,673 A | 12/1990 | Kleven | |
| 5,003,295 A | 3/1991 | Kleven | |
| 5,011,098 A | 4/1991 | McLaren et al. | |
| 5,043,558 A | 8/1991 | Byles | |
| 5,088,277 A | 2/1992 | Schulze | |
| 5,114,100 A | 5/1992 | Rudolph et al. | |
| 5,140,135 A | 8/1992 | Freeman | |
| 5,243,185 A | 9/1993 | Blackwood | |
| 5,257,498 A | 11/1993 | Nikkanen et al. | |
| 5,313,202 A | 5/1994 | Hansman, Jr. et al. | |
| 5,354,015 A | 10/1994 | Meador | |
| 5,365,731 A | 11/1994 | Nikkanen et al. | |
| 5,398,547 A | 3/1995 | Gerardi et al. | |
| 5,400,984 A | 3/1995 | Arnold et al. | |
| 5,484,121 A | 1/1996 | Padawer et al. | |
| 5,488,375 A | 1/1996 | Michie | |
| 5,551,288 A * | 9/1996 | Geraldi et al. | 73/170.26 |
| 5,575,440 A | 11/1996 | LeBlond et al. | |
| 5,616,861 A | 4/1997 | Hagen | |
| 5,619,144 A | 4/1997 | Stormbom et al. | |
| 5,628,565 A | 5/1997 | Hagen et al. | |
| 5,644,080 A | 7/1997 | Stormbom et al. | |
| 5,650,610 A | 7/1997 | Gagnon et al. | |
| 5,653,538 A | 8/1997 | Phillips | |
| 5,748,091 A | 5/1998 | Kim | |
| 5,752,674 A | 5/1998 | Mears et al. | |
| 5,763,858 A | 6/1998 | Jones | |
| 5,777,481 A | 7/1998 | Vivekanandan | |
| 5,796,612 A * | 8/1998 | Palmer | 701/4 |
| 5,841,079 A | 11/1998 | Parente | |
| 5,874,672 A | 2/1999 | Gerardi | |
| RE36,215 E | 6/1999 | Rosenthal | |
| 5,934,617 A | 8/1999 | Rutherford | |
| 5,965,814 A | 10/1999 | French et al. | |
| 6,049,282 A | 4/2000 | MacKenzie et al. | |
| 6,070,475 A | 6/2000 | Muehlhauser et al. | |
| 6,140,942 A | 10/2000 | Bragg | |
| 6,166,657 A * | 12/2000 | Mann | 340/905 |
| 6,194,685 B1 | 2/2001 | Rutherford | |
| 6,237,874 B1 | 5/2001 | Rutherford et al. | |
| 6,247,669 B1 | 6/2001 | Rauckhorst, III et al. | |
| 6,250,149 B1 | 6/2001 | Black | |
| 6,250,801 B1 | 6/2001 | Bernard et al. | |
| 6,269,320 B1 | 7/2001 | Otto | |
| 6,304,194 B1 * | 10/2001 | McKillip | 340/962 |
| 6,320,511 B1 | 11/2001 | Cronin et al. | |
| 6,328,467 B1 | 12/2001 | Keyhani | |
| 6,347,767 B1 | 2/2002 | Holmen et al. | |
| 6,370,450 B1 | 4/2002 | Kromer et al. | |
| 6,371,411 B1 | 4/2002 | Breer et al. | |
| 6,384,611 B1 | 5/2002 | Wallace et al. | |
| 6,430,996 B1 * | 8/2002 | Anderson et al. | 73/170.26 |
| 6,434,504 B1 | 8/2002 | Eryurek et al. | |
| 6,438,502 B1 | 8/2002 | Awtrey et al. | |
| 6,449,574 B1 | 9/2002 | Eryurek et al. | |
| 6,457,676 B1 | 10/2002 | Breer et al. | |
| 6,490,876 B2 | 12/2002 | Derryberry et al. | |
| 6,519,546 B1 | 2/2003 | Eryurek et al. | |
| 6,560,551 B1 * | 5/2003 | Severson et al. | 702/54 |
| 6,581,391 B2 | 6/2003 | Horey et al. | |
| 6,609,825 B2 | 8/2003 | Ice et al. | |
| 6,631,638 B2 | 10/2003 | James et al. | |
| 6,688,558 B2 | 2/2004 | Breer et al. | |
| 6,809,648 B1 * | 10/2004 | Fleming | 340/601 |
| 6,813,020 B2 | 11/2004 | Roques et al. | |
| 6,827,485 B2 | 12/2004 | Isebrand | |
| 6,868,721 B2 | 3/2005 | Szilder et al. | |
| 6,905,242 B2 | 6/2005 | Heuer et al. | |
| 7,014,357 B2 | 3/2006 | Severson | |
| 7,014,359 B2 | 3/2006 | Suga et al. | |
| 7,056,013 B2 | 6/2006 | Anderson et al. | |
| 7,150,560 B2 | 12/2006 | Hanson et al. | |
| 7,174,782 B2 | 2/2007 | Ice | |
| 7,175,136 B2 * | 2/2007 | Shah et al. | 244/134 R |
| 2004/0206854 A1 | 10/2004 | Shah et al. | |
| 2005/0276696 A1 | 12/2005 | LeMieux | |
| 2007/0267546 A1 | 11/2007 | Shah et al. | |
| 2009/0321576 A1 | 12/2009 | Shah et al. | |

FOREIGN PATENT DOCUMENTS

| | | |
|---|---|---|
| GB | 2158939 | 11/1985 |
| GB | 2283315 | 5/1995 |
| GB | 2329016 | 3/1999 |
| GB | 2329016 A * | 3/1999 |
| WO | WO-8101331 | 5/1981 |
| WO | WO-0142751 | 6/2001 |
| WO | WO-2004110865 | 12/2004 |
| WO | WO-2005020175 | 3/2005 |

OTHER PUBLICATIONS cfdrl.edu, "Stagnation Temperature," http://cdrl.uc.edu/WebPage/Courses/comp_flow/cf_problems/cf_prob3.html.

Mahoney, "In Situ Aircraft Temperature Measurement," http://mtp.jpl.nasa.gov/notes/sat/sat.html, Sep. 16, 2002.

SEA International, "Aircraft Ice Detectors and Icing Rate Measuring nstruments," SEA AIR, Aerospace Informaiton Report, Issued Apr. 1994, Society of Automotive Engineers, Inc., USA.

Wikipedia, "Total Air Temperature," http://en.wikipedia.org/wiki/Total_air_temperature.

"Aerospace Information Report SAE AIR 4367," Issue Apr. 1995, Society of Automotive Engineers Inc.

"Aerospace Standard SAE As 8181," Issue Aug. 1997, Society of Automotive Engineers Inc.

"AIAA-2001-0398 Certification and Integration Aspects of a Primary Ice Detection System," 39th Aerospace Sciences Meeting and Exhibit, Jan. 8-11, 2001.

"In Flight Icing", RAP Annual Scientific Report 2003, www.wrap.ucar.edu, Feb. 6, 2004, p. 1-11 <http://www.wrap.ucar.edu/>.

Chinese Office Action for Patent Application No. 03826928.7; Applicant: Boeing Co.; Date of Mailing: May 16, 2008 (6 pages).

Elliot Aviation, "New System Warns King Air Pilots of Inflight Icing," Wavelink News Magazine, Wavelink Articles, 2 pages, www.

(56) References Cited

OTHER PUBLICATIONS elliottaviation.com/wavelink/1998q2/wavart03A.asp [accessed Nov. 20, 2002] <http://www.elliottaviation.com/wavelink/1998q2/wavart03A.asp>.

European Office Action for Patent Application No. 03810875.9; Applicant: Boeing Co.; Date of Mailing: Jul. 28, 2008 (3 pages).

Goodrich Corporation, Sensor Systems, Model 101 and 102, Total Temperature Sensors, Measuring Total Temperature, www.aerospace.goodrich.com, 8 pages, Burnsville, MN, USA.

Goodrich Corporation, Sensor Systems, Model 102LJ2AG, Total Temperature Sensor, www.aerospace.goodrich.com, 2 pages, Burnsville, MN, USA.

Goodrich Corporation, Sensor Systems, Total Temperature Sensors, Technical Report 5755, www.aerospace.goodrich.com, 32 pages, Burnsville, MN, USA.

Kim, J.J., "Heat Transfer Model of a Jet Pump Cowl Anti-Ice System", 1996 World Aviation Congress, SAE International and American Institute of Aeronautics and Astronautics, Los Angeles, California, Oct. 21-24, 1996, pp. 1-15.

Noca, F. et al., "Aircraft Mounted Cloud Water Content Probe," New Technology Report, Center for Space Microelectronics Technology, Jet Propulsion Laboratory, 13 pages, Pasadena, California.

Canadian Office Action for Canada Patent Application No. 2,535,885, Applicant: The Boeing Company, mailed Apr. 11, 2011, 4 pages.

"AIAA-2001-0679 Ludlam Limit Considerations on Cylinder Ice Accretion: Aerodynamics and Thermodynamics," 39th Aerospace Sciences Meeting & Exhibit, Jan. 8-11, 2001 (21 pgs.).

* cited by examiner

METHODS AND SYSTEMS FOR DETECTING ICING CONDITIONS

TECHNICAL FIELD

The present invention is directed generally toward methods and systems for detecting icing conditions, for example, during aircraft flight.

BACKGROUND

Many modern aircraft, including commercial aircraft, general aviation aircraft, business aircraft and military aircraft are designed to fly through almost all types of weather. One potentially harmful weather condition that such aircraft encounter is in-flight icing. When flying through icing conditions, aircraft encounter regions of supercooled water droplets, which can impinge on critical aircraft surfaces (including wing leading edges, engine inlets and flight control surfaces), then freeze and form accretions of ice. The ice accretions can inhibit aircraft performance and/or damage the aircraft (e.g., by breaking off and striking aircraft components).

One approach to addressing aircraft icing is to provide the aircraft with in-flight anti-icing or de-icing equipment. Another approach, which can be used in conjunction with such equipment, is to provide the aircraft with an on-board ice detection system. Such detection systems can (a) trigger the anti-icing/de-icing equipment, and (b) alert the pilot to the presence of icing conditions so that the pilot can minimize the time spent in such conditions. One typical ice detection system is a magneto-resistive system, which detects ice as it accretes. One potential drawback with this system is that, because the ice must accrete before the icing condition is detected, the aircraft performance may degrade prior to activating an anti- or de-icing system, or before flying out of the icing environment. Such a degradation, while not presenting a safety issue for the aircraft, can reduce fuel efficiency of the aircraft and therefore increase the cost of operating the aircraft.

SUMMARY

The present invention is directed generally toward systems and methods for detecting icing or incipient icing conditions external to a vehicle, for example, an aircraft. A system in accordance with one aspect of the invention includes a temperature sensor configured to direct a first signal corresponding to a temperature of an airstream. The system can further include a water content sensor configured to direct a second signal corresponding to a water content of the airstream. A processing unit can be coupled to the temperature sensor and the water content sensor to receive the first and second signals and, based on at least the first and second signals, provide an indication when at least the first and second signals taken together correspond to an at least incipient icing condition.

In further particular aspects of the invention, the water content sensor can include at least one of a liquid water content sensor, a total water content sensor, and an ice crystal sensor. The temperature sensor, the water content sensor, and the processing unit can be configured to mount to an aircraft, and the temperature sensor and the water content sensor can be positioned remotely from each other or in a single housing.

A method in accordance with another aspect of the invention includes receiving a first signal corresponding to a temperature of an airstream external to a vehicle, receiving a second signal corresponding to a water content of the airstream, and, based on at least the first and second signals, automatically generating an indication when at least the first and second signals taken together correspond to an at least incipient icing condition. In further particular aspects of the invention, the method can further include determining when the temperature sensor detects a temperature corresponding to a static temperature at or below a local freezing point for water, determining when the water content sensor detects liquid water, and generating an indication only when both the temperature sensor detects a temperature corresponding to a static temperature at or below a local freezing point for water, and the water content sensor detects liquid water. In still a further aspect of the invention, the method can include receiving a third signal corresponding to a pressure of the airstream and determining whether the first signal corresponds to a temperature at or below which water freezes based on the first signal and the third signal together.

DETAILED DESCRIPTION

The present disclosure describes methods and systems for detecting icing or incipient icing conditions, for example, on board an airborne aircraft. Many specific details of certain embodiments of the invention are set forth in the following description and in FIGS. 1-5 to provide a thorough understanding of these embodiments. One skilled in the art, however, will understand that the present invention may have additional embodiments, and that the invention may be practiced without several of the details described below.

Figure 1:
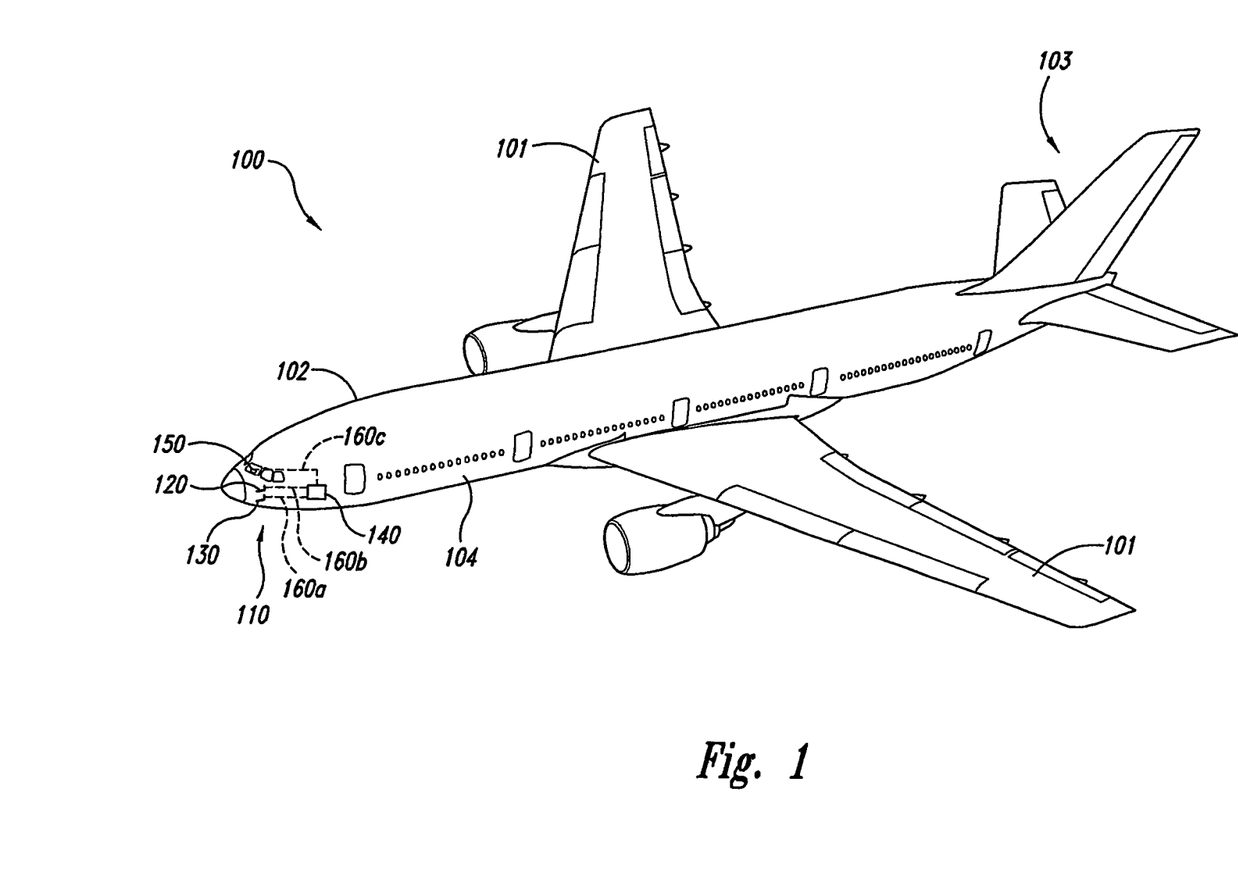
FIG. 1 is a partially schematic, isometric illustration of an aircraft having an ice detection system configured in accordance with an embodiment of the invention.

FIG. 1 is a partially schematic, isometric illustration of an aircraft 100 carrying an ice detection system 110 configured in accordance with an embodiment of the invention. In one aspect of this embodiment, the aircraft 100 includes a fuselage 104, wings 101 depending from the fuselage 104, and an empennage 103 positioned to provide stability and control about the aircraft pitch and yaw axes. The aircraft 100 can further include a propulsion system 102, for example, a twin engine arrangement, with each engine positioned in a podded nacelle depending from a corresponding wing 101. In other embodiments, the aircraft 100 can have other general arrangements.

In any of the foregoing embodiments, the ice detection system 110 can include a temperature sensor 120 and a water content sensor 130, each coupled to a processing unit 140 with a link 160 (shown as input links 160a, 160b). The processing unit 140 can be configured to receive data from the temperature sensor 120 and the water content sensor 130 and, based on the information received from these sensors, determine when icing or incipient icing conditions exist in the environment external to the aircraft 100. When such conditions exist, the processing unit 140 can automatically generate an indication signal, transmitted via an output link 160c to an indicator 150. In one aspect of this embodiment, the indicator 150 can provide information exclusively to personnel in the flight deck of the aircraft. In other embodiments, such information can also be provided to ground-based equipment and/or recording equipment carried by the aircraft 100. Further details of embodiments of the ice detection system 110 are described below with reference to FIGS. 2-5B.

Figure 2:
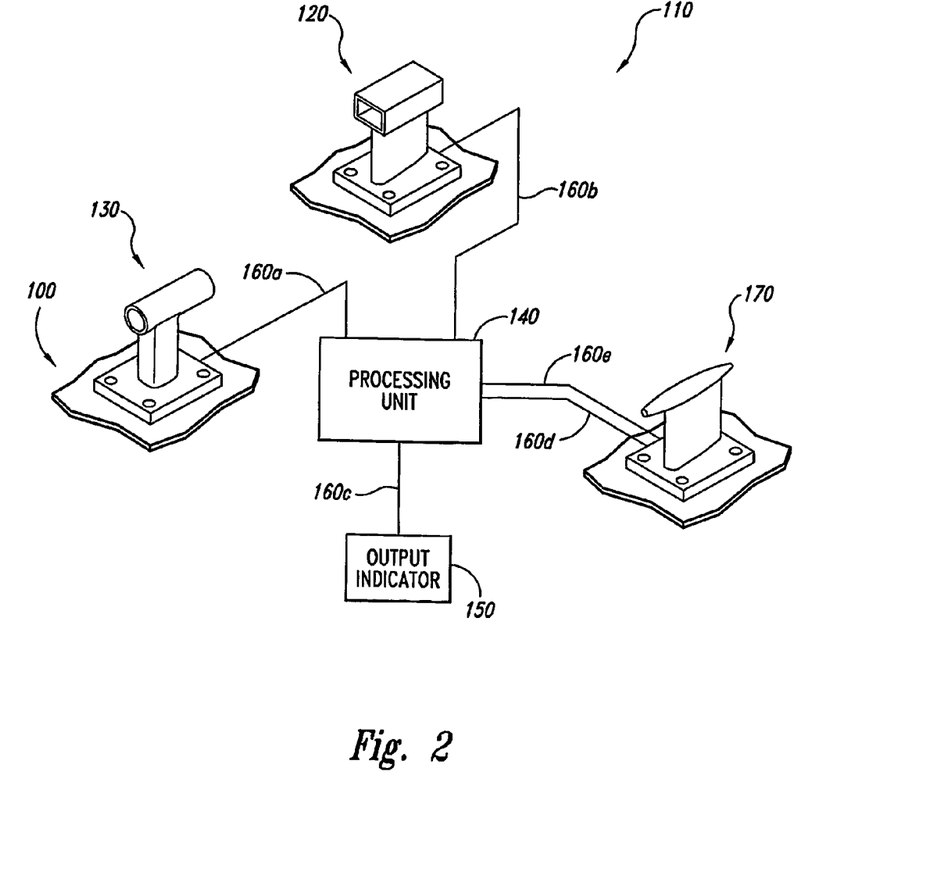
FIG. 2 is a partially schematic, isometric illustration of components of an ice detection system configured in accordance with an embodiment of the invention.

FIG. 2 is a partially schematic, isometric illustration of an embodiment of the ice detection system 110. In one aspect of this embodiment, the temperature sensor 120 and the water content sensor 130 are positioned remotely from each other and mounted to the aircraft 100 (external surface portions of which are shown in FIG. 2). In another embodiment, described in greater detail below with reference to FIG. 5, the temperature sensor 120 and the water content sensor 130 can be co-located in a single device. In either embodiment, the temperature sensor 120 and the water content sensor 130 are operatively coupled to the processing unit 140 to provide the information necessary for the processing unit 140 to determine when at least incipient icing conditions exist. As used herein, the term at least incipient icing is used to include conditions generally favorable to the formation of ice, and/or conditions under which ice is actually forming.

In one aspect of an embodiment shown in FIG. 2, the temperature sensor 120 can include a static air temperature probe that directly measures the static temperature of the airstream external to the aircraft 100. In another embodiment, the temperature sensor 120 can include a total temperature sensor, such as a model 300536 TAT sensor, from SpaceAge control of Palmdale, Calif. Because the determination for incipient icing conditions is typically based on the static air temperature, if the temperature sensor 120 includes a total air temperature probe, the system 110 can further include a pressure sensor 170 that provides data by which the processing unit 140 can determine the static air temperature based on the total air temperature. In one aspect of this embodiment, the pressure sensor 170 can include the pitot-static probe system typically provided on the aircraft 100. In other embodiments, the pressure sensor 170 can include other separate systems. In any of these embodiments, the pressure sensor 170 can detect the total air pressure and static air pressure of the environment outside the aircraft 100 and transmit corresponding signals to the processing unit 140 via input links 160d and 160e. Based on this information, the processing unit 140 can calculate the static air temperature and combine this information with information received from the water content sensor 130 to determine incipient icing conditions. In another embodiment, a separate device can calculate the static air temperature from the pressure data. Such devices are available from Insight Avionics of Buffalo, N.Y.

In one aspect of an embodiment shown in FIG. 2, the water content sensor 130 can include a liquid water content measuring probe, such as a Johnson-Williams probe, available from Particle Measuring Systems, Inc. of Boulder, Colo. Such a probe can determine the liquid water content of the airstream passing through it based on heat loss from a heated wire which is positioned to be impinged by water in the airstream. In other embodiments, the water content sensor 130 can have other arrangements. For example, the water content sensor 130 can include an ice crystal sensing capability and/or a total water sensing capability to detect mixed-phase or ice crystal icing conditions. In a particular aspect of this embodiment, the ice crystal sensing capability and/or the total water sensing capability can be provided in addition to the liquid water sensing capability. In any of these embodiments, the water content sensor 130 can generate a signal, transmitted via the input link 160a, which can indicate whether or not the airstream passing adjacent to the aircraft 100 includes water.

In any of the foregoing embodiments, the processing unit 140 can receive information from the temperature sensor 120, the water content sensor 130 (and, optionally, the pressure sensor 170). The processing unit 140 can include an existing portion of the aircraft flight data system (e.g., programmed to carry out the above functions), or a stand-alone unit, either of which can provide an output signal to the output indicator 150 via the output link 160c. In one embodiment, the output indicator 150 can include a visual display positioned for visual access by the flight crew, so that the flight crew can be made aware of incipient icing conditions and can respond accordingly, for example, by changing the aircraft flight path and/or by activating an anti-icing or de-icing system. In other embodiments, the output indicator 150 can include an audible alarm or can provide notification to the flight crew via other techniques. In any of these embodiments, the processing unit 140 can collect and process data to provide the appropriate output signal, as described in greater detail below with reference to FIGS. 3-4B.

Figure 3:
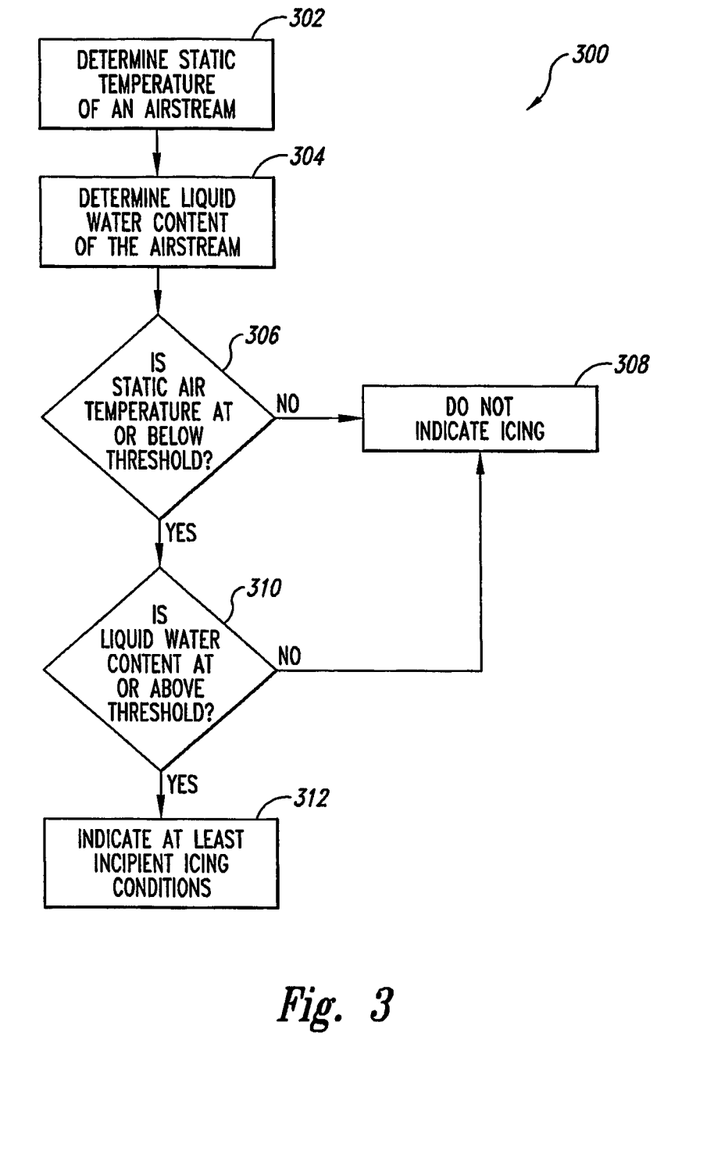
FIG. 3 is a flow chart illustrating a method for detecting at least incipient icing conditions in accordance with an embodiment of the invention.
Figure 4A:
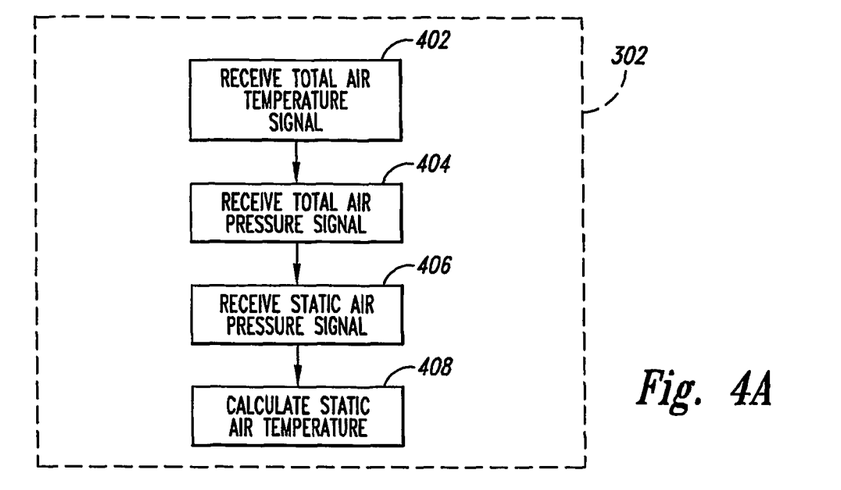
FIGS. 4A-4B are flow diagrams illustrating aspects of methods for detecting at least incipient icing conditions in accordance with further embodiments of the invention.

FIG. 3 is a flow chart illustrating a method 300 (carried out, for example, by the processing unit 140) for determining at least incipient icing conditions in accordance with an embodiment of the invention. In one aspect of this embodiment, the method 300 can include determining a static air temperature of an airstream (process portion 302) and determining a liquid water content of the airstream (process portion 304). The method 300 can further include determining whether the static air temperature is at or below a pre-selected threshold value (process portion 306). In one aspect of this embodiment, the pre-selected threshold value can be fixed for all flight conditions, and in other embodiments, the threshold value can depend on certain flight conditions, for example, aircraft altitude. In either embodiment, if the static air temperature is not at or below the threshold value, the method includes not indicating an icing condition (process portion 308). If the static air temperature is at or below the threshold value, the method 300 proceeds to process portion 310.

In process portion 310 the method 300 includes determining whether the liquid water content is at or above a threshold value. In a particular aspect of this embodiment, the threshold value can be non-zero, so that the system does not provide positive indications for inconsequential amounts of detected liquid water content. If the liquid water content is not at or above the threshold value, the method 300 includes not indicating an icing condition (process portion 308). If the liquid water content is at or above the threshold value, then the method 300 can include indicating at least incipient icing conditions (process portion 312).

Figure 4B:
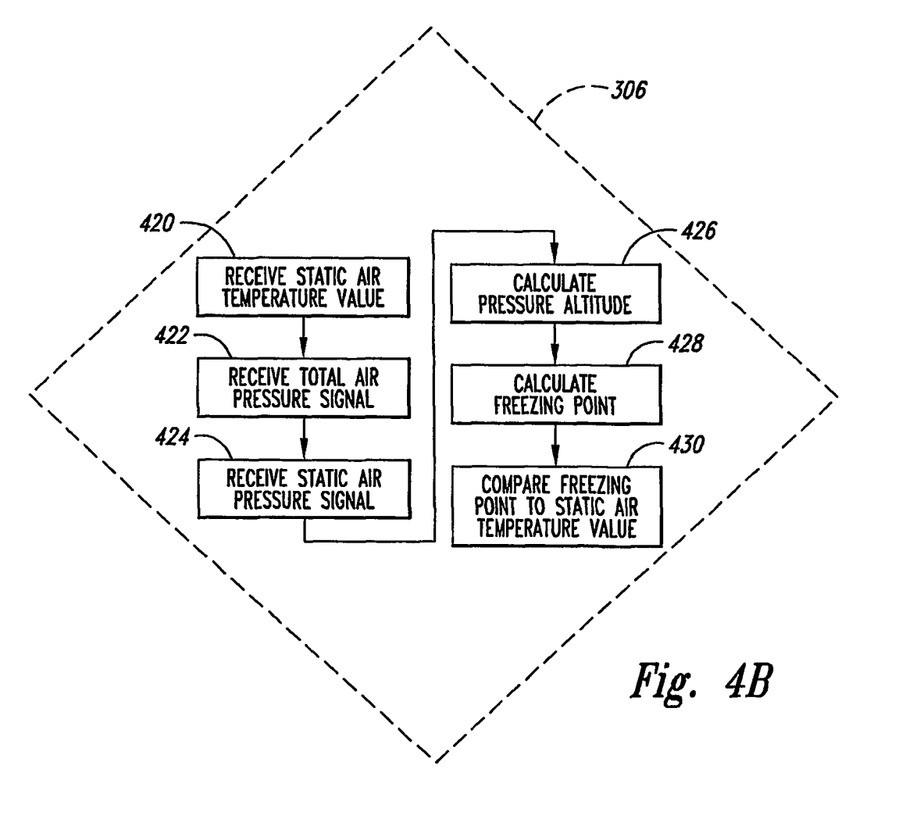
Figure 5:
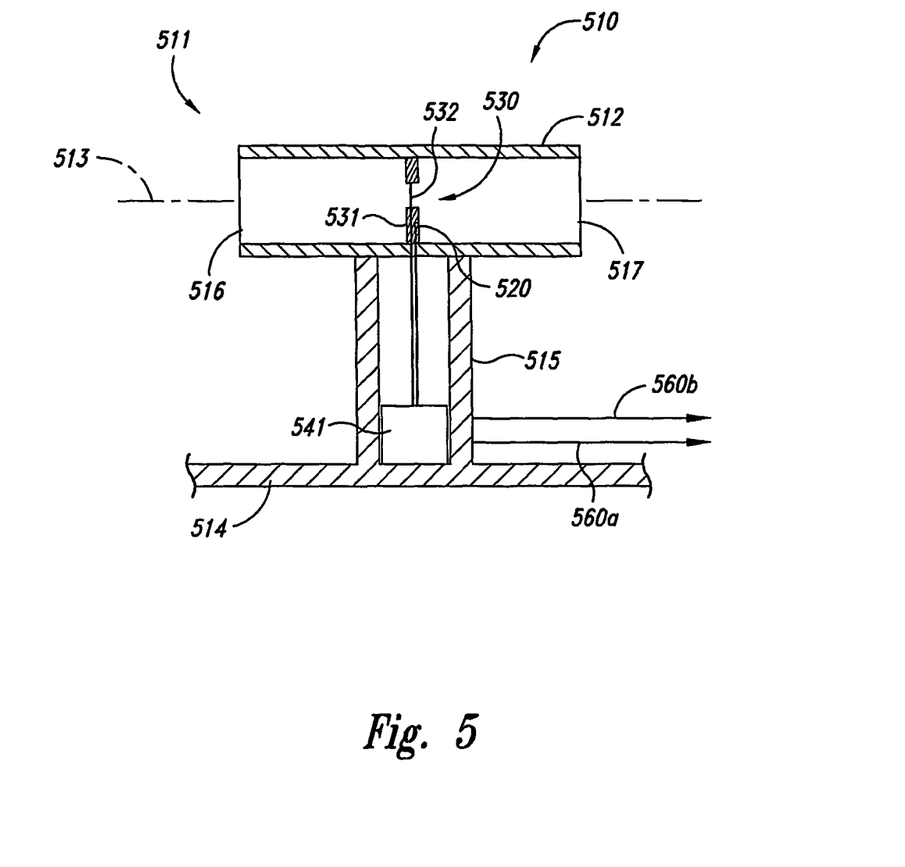
FIG. 5 is a partially schematic, cross-sectional illustration of an ice detection system having a water content detector and a temperature sensor co-located in accordance with an embodiment of the invention.

FIGS. 4A-4B illustrate further details of process portions 302 and 306, in accordance with other embodiments of the invention. Referring first to FIG. 4A, process portion 302 (which includes determining the static air temperature of the airstream) can include first receiving a signal corresponding to a total air temperature (process portion 402), for example, from a total air temperature probe. The method can further include receiving signals corresponding to a total air pressure (process portion 404) and static air pressure (process portion 406), for example, from a pressure sensor 170 (described above with reference to FIG. 2). In process portion 408 the static air temperature is calculated, for example, using readily available techniques based on the total air temperature and the ratio of the static air pressure to the total air pressure. In other embodiments, the static air temperature can be calculated in accordance with other methods. For example, the static air temperature can be calculated based on the received total air temperature signal (process portion 402) and an indication of the speed and altitude of the aircraft, which may in turn be based upon calculations from the total air pressure and static air pressure signals described above. In any of these embodiments, process portion 302 can include either determining the static air temperature of the airstream directly from a static air temperature sensor, or indirectly via calculations performed on data received from a total air temperature sensor.

Referring now to FIG. 4B, process portion 306 (which includes determining whether the static air temperature is at or below a threshold value) can include receiving the static air temperature value (process portion 420) and receiving signals corresponding to the total air pressure (process portion 422) and static air pressure (process portion 424). The method can further include calculating the pressure-altitude at which the aircraft is flying (process portion 426). Based on the total air pressure and the static air pressure, the method can further include calculating a local freezing point, based on the pressure altitude (process portion 428). In process portion 430, the method can include comparing the local freezing point to the static air temperature value to determine whether the static air temperature value is at or below the local freezing point. If so, then the method includes determining whether the liquid water content is at or below the threshold value (process portion 310, discussed above with reference to FIG. 3). If not, then the method includes not indicating an incipient icing condition (process portion 308, FIG. 3).

In any of the embodiments described above, the foregoing methods can be completed by a suitable computing system, including the aircraft flight data system or a separate system. The routines for carrying out the processes described above can be encoded in hardware, software or other computer-readable media. In any of these embodiments, some or all of the foregoing processes are completed automatically. An advantage of this arrangement is that it can reduce crew workload and improve system repeatability and reliability.

In one aspect of an embodiment described above with reference to FIG. 2, the ice detection system 110 includes a temperature sensor 120 positioned remotely from a water content sensor 130. In another embodiment, shown in FIG. 5, an ice detection system 510 can include a temperature sensor 520 and a water content sensor 530 co-located in a single housing 511. In one aspect of this embodiment, the housing 511 can include a base 514, a support 515 extending away from the base 514, and a flow channel 512 carried by the support 515. The flow channel 512 can include an entrance 516 and an exit 517 positioned downstream from the entrance 516 and aligned with the entrance 516 along a flow axis 513. The flow channel 512 can carry a probe mast 531 extending into the airstream captured by the flow channel 512. The probe mast 531 can support a heated wire 532 which is positioned to impinge water (for example, liquid water) contained in the captured airstream. In a particular aspect of this embodiment, the temperature sensor 520 can be positioned at a lee surface of the probe mast 531, so as not to be directly exposed to water in the captured airstream. Accordingly, the temperature sensor 520 can measure the actual total or static temperature without being influenced by any water in the captured airstream. The detector 510 can optionally include a pre-processor 541 (for example, to condition the signals received from the heated wire 532 and the temperature sensor 520) and can provide output signals to a processing unit (such as the processing unit 140 described above) via output links 560a and 560b.

One feature of at least several of the embodiments of the systems described above is that they can automatically determine at least incipient icing conditions based on signals corresponding to both temperature and water content. As discussed above, this arrangement can reduce crew workload and improve system performance. Another feature of at least several embodiments of the systems described above is that they can detect conditions favorable for ice formation without first requiring significant accretions of ice to form. As a result, the flight crew can more quickly respond to the presence of icing conditions, for example by changing flight path and/or activating an ice protection system.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A system for detecting icing conditions external to a vehicle, comprising:
a housing carried by the vehicle and positioned external to the vehicle and having a straight flow channel positioned along a straight flow axis external to the vehicle, the straight flow channel having an entrance and an exit positioned to receive an airstream;
a probe positioned in the straight flow channel, along the straight flow axis, external to the vehicle, and having a first surface positioned to face toward the airstream as the airstream travels along the straight flow axis, the probe further having a second surface facing opposite from the first surface;
a temperature sensor positioned in the housing, mounted to the probe and positioned in the flow channel along the straight flow axis between the entrance and the exit, the temperature sensor being positioned to face downstream at least proximate to the second surface of the probe, the temperature sensor being configured to direct a first signal corresponding to a temperature of the airstream;
a water content sensor positioned in the housing, mounted to the probe and positioned in the flow channel along the straight flow axis between the entrance and the exit, the water content sensor being configured to direct a second signal corresponding to a water content of the airstream; and
a processing unit coupled to the temperature sensor and the water content sensor to receive the first and second signals and, based on at least the first and second signals, provide an indication when at least the first and second signals taken together correspond to an at least incipient icing condition.

2. The system of claim 1 wherein the water content sensor includes at least one of a liquid water content sensor, a total water content sensor and an ice crystal sensor.

3. The system of claim 1 wherein the temperature sensor, the water content sensor and the processing unit are configured to mount to an aircraft.

4. The system of claim 1 wherein the water content sensor includes a heated wire positioned to be impinged by water contained in the airstream.

5. The system of claim 1 wherein the processing unit is configured to provide a positive indication of an at least incipient icing condition when the temperature sensor detects a temperature corresponding to a static temperature at or below a local freezing point for water, and the water content sensor detects liquid water.

6. The system of claim 1 wherein the temperature sensor is configured to detect a total temperature of the airstream.

7. The system of claim 1 wherein the temperature sensor is configured to detect a total temperature of the airstream, and wherein the processing unit is configured to determine a static temperature of the airstream based at least in part on the first signal.

8. The system of claim 1 wherein the processing unit is operatively couplable to a pressure sensor to receive a third signal corresponding to a pressure of the airstream, and wherein the processing unit is configured to provide the indication based on the first, second and third signals.

9. The system of claim 1, further comprising an aircraft having a fuselage portion, a wing portion, an empennage portion and a propulsion system, and wherein each of the temperature sensor, the water content sensor and the processing unit is carried by at least one of the fuselage portion, the wing portion, the empennage portion and the propulsion system.

10. A system for detecting icing conditions external to a vehicle, comprising:
   a housing carried by the vehicle and positioned external to the vehicle and having a straight flow channel positioned along a straight flow axis external to the vehicle, the flow channel having an entrance and an exit positioned to receive an airstream;
   a probe positioned in the straight flow channel, along the straight flow axis external to the vehicle and having a first surface positioned to face toward the airstream as the airstream travels along the straight flow axis, the probe further having a second surface facing opposite from the first surface;
   temperature sensing means positioned in the straight flow channel and configured to sense a temperature of an airstream and direct a first signal corresponding to the temperature, the temperature sensing means being mounted to the probe and positioned in the straight flow channel along the straight flow axis between the entrance and the exit, the temperature sensing means being positioned to face downstream at least proximate to the second surface of the probe;
   water content sensing means positioned in the housing, mounted to the probe and positioned in the straight flow channel along the straight flow axis between the entrance and the exit, the water content sensing means being configured to sense a water content of the airstream and direct a second signal corresponding to the water content; and
   processing means coupled to the temperature sensing means and the water content sensing means and configured to receive the first and second signals and, based at least on the first and second signals, provide an indication when at least the first and second signals taken together correspond to an at least incipient icing condition.

11. The system of claim 10 wherein the temperature sensing means, the water content sensing means and the processing means are configured to mount to an aircraft.

12. The system of claim 10 wherein the processing means is configured to provide a positive indication of an at least incipient icing condition when the temperature sensing means detects a temperature corresponding to a static temperature at or below a local freezing point for water, and the water content sensing means detects liquid water.

13. A method for detecting icing conditions external to a vehicle, comprising:
   receiving signals from a device carried external to the vehicle, the device including:
      a housing carried by the vehicle and positioned external to the vehicle and having a straight flow channel positioned along a straight flow axis external to the vehicle, the flow channel having an entrance and an exit positioned to receive an airstream;
      a probe positioned in the straight flow channel, along the straight flow axis external to the vehicle, and having a first surface positioned to face toward the airstream as the airstream travels along the straight flow axis, the probe further having a second surface facing opposite from the first surface;
      a temperature sensor positioned in the housing, mounted to the probe and positioned in the straight flow channel along the straight flow axis between the entrance and the exit, the temperature sensor being positioned to face downstream at least proximate to the second surface of the probe, and being configured to direct a first signal corresponding to a temperature of the airstream;
      a water content sensor positioned in the housing, mounted to the probe and positioned in the straight flow channel along the straight flow axis between the entrance and the exit, the water content sensor being configured to direct a second signal corresponding to a water content of the airstream, wherein receiving signals includes receiving a first signal from the temperature sensor corresponding to a temperature of an airstream external to a vehicle;
   receiving a second signal from the water content sensor corresponding to a water content of the airstream; and
   based on at least the first and second signals, automatically generating an indication when at least the first and second signals taken together correspond to an at least incipient icing condition.

14. The method of claim 13 wherein receiving the second signal includes receiving the second signal from at least one of a liquid water content sensor, a total water content sensor and an ice crystal sensor.

15. The method of claim 13 wherein the processes of receiving the first signal, receiving the second signal and automatically generating an indication of claim are performed on board an aircraft.

16. The method of claim 13, further comprising:
   determining when the temperature sensor detects a temperature corresponding to a static temperature at or below a local freezing point for water;
   determining when the water content sensor detects liquid water; and
   generating the indication only when both the temperature sensor detects a temperature corresponding to a static temperature at or below a local freezing point for water and the water content sensor detects liquid water.

17. The method of claim 13 wherein receiving a first signal includes receiving a first signal corresponding to a total temperature of the airstream, and wherein the method further comprises determining a static temperature of the airstream based at least in part on the first signal.

18. The method of claim 13, further comprising:
   receiving a third signal corresponding to a pressure of the airstream; and
   determining whether the first signal corresponds to a temperature at or below which water freezes, based on the first signal and the third signal.

19. The system of claim 1 wherein the temperature sensor includes a static temperature sensor.

20. The system of claim 1 wherein the flow axis is a straight flow axis between the entrance and the exit.

\* \* \* \* \*